United States Patent
Craft et al.

(10) Patent No.: US 6,565,152 B2
(45) Date of Patent: May 20, 2003

(54) LIGHTWEIGHT SEAT ASSEMBLY FOR PUBLIC TRANSPORTATION VEHICLE

(75) Inventors: Richard D. Craft, Marshallville, GA (US); Frank Bascas, Montezuma, GA (US); Teodulo Ceballos, Jr., Brownsville, TX (US); Joseph Rafac, San Benito, TX (US); Jonathan Roy Wren, Chehalis, WA (US)

(73) Assignee: Transportation Seating, Inc., Montezuma, GA (US)

( * ) Notice: Subject to any disclaimer, the term of this patent is extended or adjusted under 35 U.S.C. 154(b) by 159 days.

(21) Appl. No.: 09/748,633

(22) Filed: Dec. 22, 2000

(65) Prior Publication Data

US 2001/0030455 A1 Oct. 18, 2001

Related U.S. Application Data

(60) Provisional application No. 60/172,070, filed on Dec. 23, 1999.

(51) Int. Cl.[7] .............................................. A47C 15/00
(52) U.S. Cl. ................................ 297/248; 297/DIG. 2; 297/452.14
(58) Field of Search ....................... 297/DIG. 2, 452.36, 297/452.31, 452.39, 451.13, 451.11, 248, 452.18, 452.19, 452.2, 452.14, 452.23, 452.24, 452.33

(56) References Cited

U.S. PATENT DOCUMENTS 3,797,887 A * 3/1974 Barecki et al.
3,841,703 A * 10/1974 Lowe
3,873,155 A   3/1975 Barecki ...................... 297/445
3,951,454 A * 4/1976 Tantlinger
4,036,527 A   7/1977 Faul
4,730,873 A * 3/1988 Janz
5,437,498 A * 8/1995 Waelde
5,833,319 A * 11/1998 Davis

* cited by examiner

Primary Examiner—Milton Nelson, Jr.
(74) Attorney, Agent, or Firm—McNair Law Firm, P.A.; Cort Flint

(57) ABSTRACT

A lightweight reinforced seat assembly for a transportation vehicle is disclosed which includes a molded seat shell having a shell exterior and a shell interior. The seat shell includes a seat section and a back section joined together by a generally curved section. A plurality of seats is formed in the seat shell. A reinforcing network of longitudinal and lateral, generally enclosed tubular rib elements reinforce the seat shell to eliminate metal framing and weight. The reinforcing rib network includes a front tubular rib element extending laterally across a front width of the seat section, and a top tubular rib element extending laterally across a top width of the back section. Longitudinal edge tubular rib elements extend on opposing edges of the seat shell generally through the seat-section, curved section, and back-section. The edge tubular rib elements are connected to the front and top tubular rib elements. An intermediate tubular rib element extends between adjacent ones of the plurality of seats connected to the front and top tubular rib elements.

41 Claims, 9 Drawing Sheets

LIGHTWEIGHT SEAT ASSEMBLY FOR PUBLIC TRANSPORTATION VEHICLE

This application claims the benefit of Provisional application No. 60/172,070 filed Dec. 23, 1999.

BACKGROUND OF THE INVENTION

This invention is directed to a lightweight seat assembly for a public transportation vehicle and, more particularly, to a method and construction in which heavy metal framing is eliminated from the seat assembly while the strength and durability of the seat assembly is increased.

Heretofore, the problems associated with seat assemblies for public transportation vehicles, such as buses, trains, and the like, has included making the seats more comfortable, durable, and vandal resistant. However, with increased environmental concerns, major city transportation authorities are under a mandate to reduce exhaust emissions, particularly with city buses. In order to meet this mandate, major city transportation authorities have been purchasing buses fueled with new technology, such as compressed natural gas, liquid natural gas, and hybrid electric, all of which substantially increase the weight of the vehicle. In order to accommodate the increased weight of the vehicle, it is necessary to decrease the weight in other components of the vehicle. In the past, seat assemblies have included a molded fiberglass seat bolted to a steel frame, as shown, for example, in U.S. Pat. No. 3,873,155. However, the problem occurs in that this type of seat assembly is very heavy because of the steel frame. This type of seat assembly has met the governmental safety requirements for public transportation vehicles, and any modifications to the vehicle seat assembly must not compromise the safety and crash test performance of the seat in order to meet governmental specifications.

Accordingly, an object of the present invention is to provide a lighter, yet stronger seat assembly for public transportation vehicles and the like.

Another object of the present invention is to provide a seat assembly for transportation vehicles wherein the heavy steel framework is eliminated, yet the strength, durability, and crash specifications of the seat are not compromised to reduce the overall weight of the transportation vehicle so that a fuel efficient vehicle may be provided.

Another object of the present invention is to provide a seat assembly for a public transportation vehicle which is reinforced with a cellular reinforcing system to provide a lightweight yet strong vehicle seat.

Yet another object of the invention is to provide a seat assembly for a transportation vehicle wherein a molded seat shell is reinforced with a reinforcing panel to create a system of reinforcing cells in the seat assembly that eliminates the need for a metal frame.

SUMMARY OF THE INVENTION

The above objectives are accomplished according to the present invention by a lightweight reinforced seat assembly for a transportation vehicle comprising a molded seat shell having a shell exterior and a shell interior. The seat shell includes a seat section and a back section joined together by a curved section. A plurality of seats included in the seat shell. A reinforcing network of longitudinal and lateral, generally enclosed tubular rib elements reinforces the seat shell whereby metal framing is eliminated. The reinforcing rib network includes a front tubular rib element extending laterally across a front width of the seat section, and a top tubular rib element extending laterally across a top width of the back section. Longitudinal tubular edge rib elements are formed on opposing edges of the seat shell extending generally through the seat-section, curved section, and back-section whereby the tubular edge rib elements are connected to the front and top rib elements. An intermediate tubular rib element extends between adjacent ones of the plurality of seats connected to the front and top tubular rib elements.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1A is a section along line 1A—1A in FIG. 1 illustrating a network of elongated tubular rib elements for reinforcing lightweight transportation vehicle seats according to the invention;

FIG. 1B is a section along line 1B—1B of FIG. 1 illustrating a network of elongated tubular rib elements for reinforcing lightweight transportation vehicle seats according to the invention;

DESCRIPTION OF A PREFERRED EMBODIMENT

Figure 1:
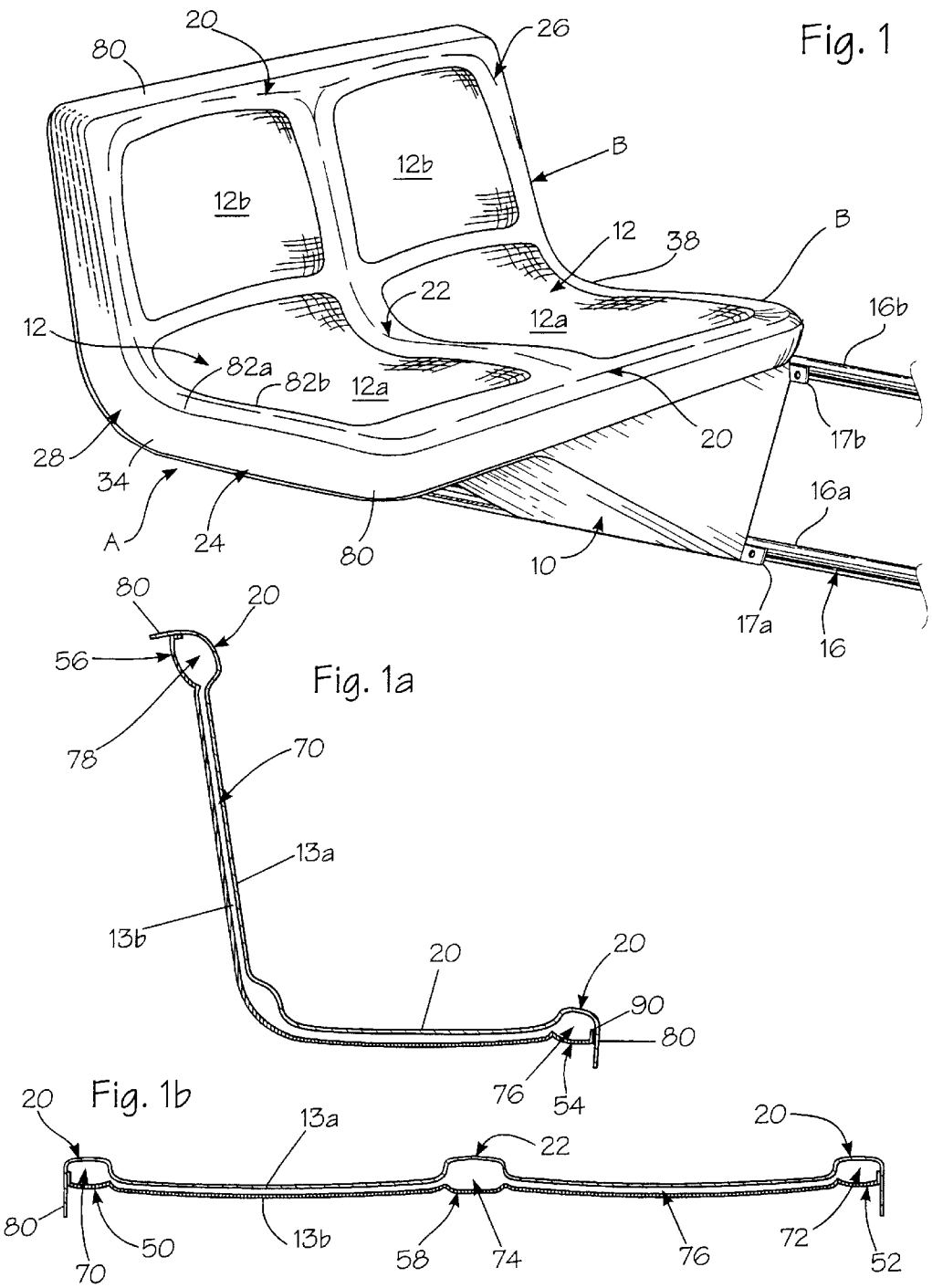
FIG. 1 is a perspective view of a transverse seat assembly for a public transportation vehicle wherein the seat assembly is affixed to the tracking system of the vehicle using a cantilevered support.

Referring now to the drawings, the invention will be described in more detail.

Referring to FIG. 1, a seat assembly, designated generally as A, is illustrated for a transportation vehicle. The illustrated seat assembly has a cantilevered support 10 and a plurality of seats, designated generally as 12. Typically, a basic transportation vehicle seat assembly includes either two, three, or four seats 12. Each seat includes a seat panel 12a and a back panel 12b.

Figure 2:
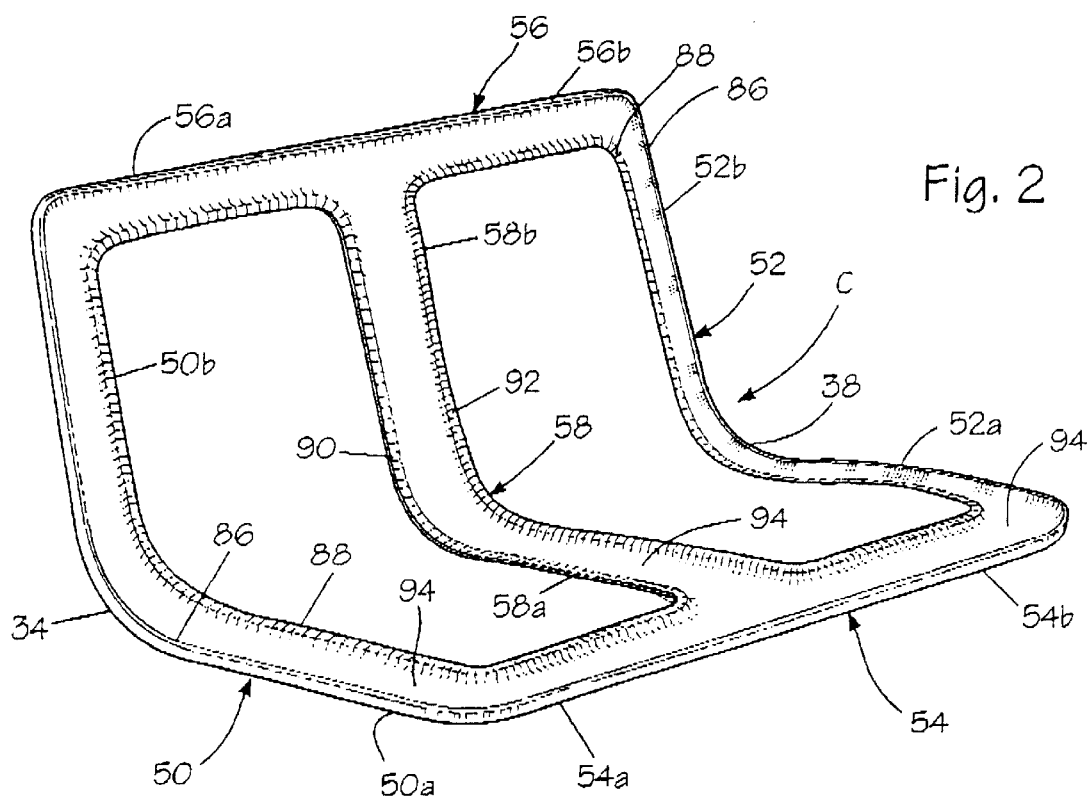
FIG. 2 is a perspective view of a arch reinforcing panel incorporated in the seat assembly of FIG. 1A.

In the illustrated embodiment, seat assembly A includes first and second seats, designated generally cantilevered support 10, secures the seat assembly to a tracking system 16 of the transportation vehicle. As can best be seen in FIGS. 1–3, seat assembly A includes an outer seat shell B having an exterior 13a and interior 13b. Seat shell B is molded from a suitable polymeric material to include an arched exterior, peripheral rib designated generally as 20, and an exterior intermediate rib, designated generally as 22, extending between adjacent ones of the plurality of seats 12. The term arch or rib is used to mean any shape which is an arch or rib, or resembles an arch or rib in form or function, particular structural strength and integrity. While defined by the seat and back recesses, the edge and intermediate ribs perform an important reinforcing function in accordance with the present invention. Secured to the back side 30 of seat shell B is a reinforcing panel, designated generally as C.

Figure 3:
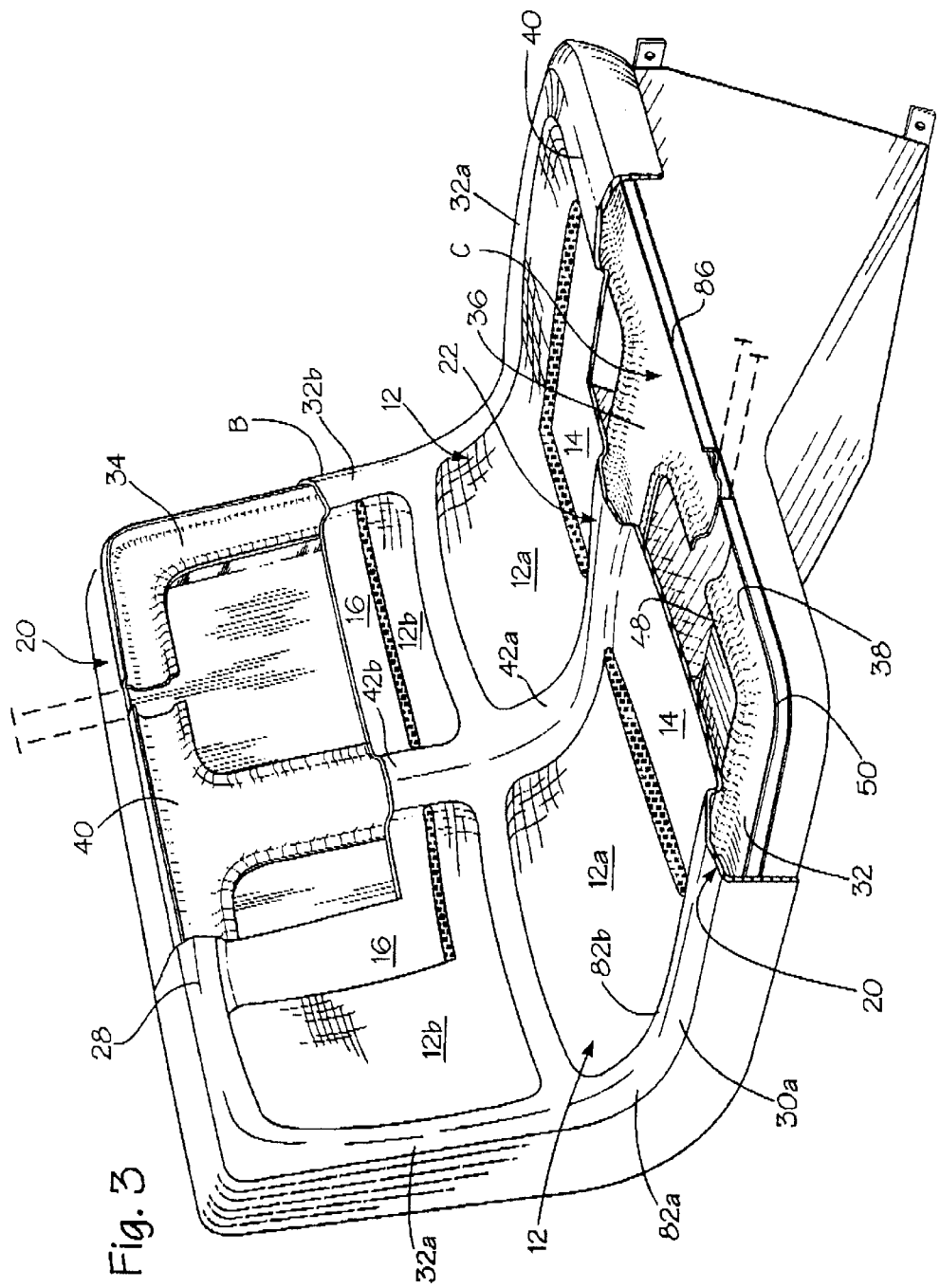
FIG. 3 is an enlarged perspective view with parts cut away showing the various layers and components of a lightweight seat assembly for a public transportation vehicle constructed according to the invention.

As can best be seen in FIGS. 1 and 3, seat shell B can be seen to comprise a seat section, designated generally as 24, and a back second, designated generally as 26, joined together by a curved section, designated generally as 28. While exterior peripheral and intermediate ribs 20, 22 are illustrated as a continuous network and one-piece, peripheral rib 20 can also be seen as comprising first exterior seat and back ribs 30a, 32a on a first edge 34 of seat shell B and seat section 24 and back section 26. The first exterior seat and back ribs are continuous and extend through curved section 28. Integral with first back rib 32a is an exterior transverse top seat rib 36 which terminates in a second exterior back rib 38a. Second back rib 32b is integral with an exterior second seat rib 30b, through curved section 28, on a second edge 38 of shell B. Finally, there is an exterior front transverse rib 40 extending between first and second exterior seat ribs 30a, 30b across a front width of seat section 24. Likewise, exterior intermediate rib 22 can be seen as an exterior intermediate seat rib 42a and an intermediate back rib 42b, integral and extending continuously through curved section 28.

Secured to interior 13b of seat shell B is a ribbed reinforcing panel, designated generally as C. Basically, ribbed panel C includes a network of ribs that includes a seat-section rib structure, designated generally as 44, and a back-section ribbed structure, designated generally as 46 conforming to the shape of seat shell B. Preferably the rib network structure is molded as one piece and affixed to interior 13b by glue welding. As illustrated in the one-piece embodiment of FIG. 2, ribbed panel C includes a first interior edge rib, designated generally as 50, and a second interior edge rib 52. First and second interior edge ribs, designated generally as 50 and 52, extend between a front interior transverse rib, designated generally as 54, and a top interior transverse rib, designated generally as 56. Extending between front and top interior ribs 54, 56 is an intermediate interior rib, designated generally as 58. There is an intermediate rib between each adjacent seats 12, which is two seats in the illustrated embodiment. The interior rib structure can also be described as first and second interior ribs 50 and 52, including first and second interior seat ribs 50a and 52a in the seat-section rib structure 50. There are front interior transverse seat ribs 60a, 60b across a width of the front to reinforce seat recesses 14. There is an interior intermediate seat rib 58a and an intermediate back rib 58b between adjacent back recesses 16 and adjacent seat recesses 14. Referring to the interior back-section rib structure 26, there are first and second interior back ribs 50b and 52b as first and second shell edges 34, 38, respectively. Top interior transverse ribs 58a, 58b reinforce the back section above seat backs 12b. It can be seen that reinforcing panel C is molded as one piece, and that the panel arches intersect one another to provide a continuous reinforcing ribbed arch structure. Preferably the panel ribs have a flattened U-shape cross-section, as can best be seen in FIGS. 1A and 1B. On the exterior of seat shell B, the seat recesses 14 receive seat inserts 64, which are affixed by any suitable means. Likewise, back recesses 16 receive back inserts 66, respectively.

Figures 5, 5A, 5B:
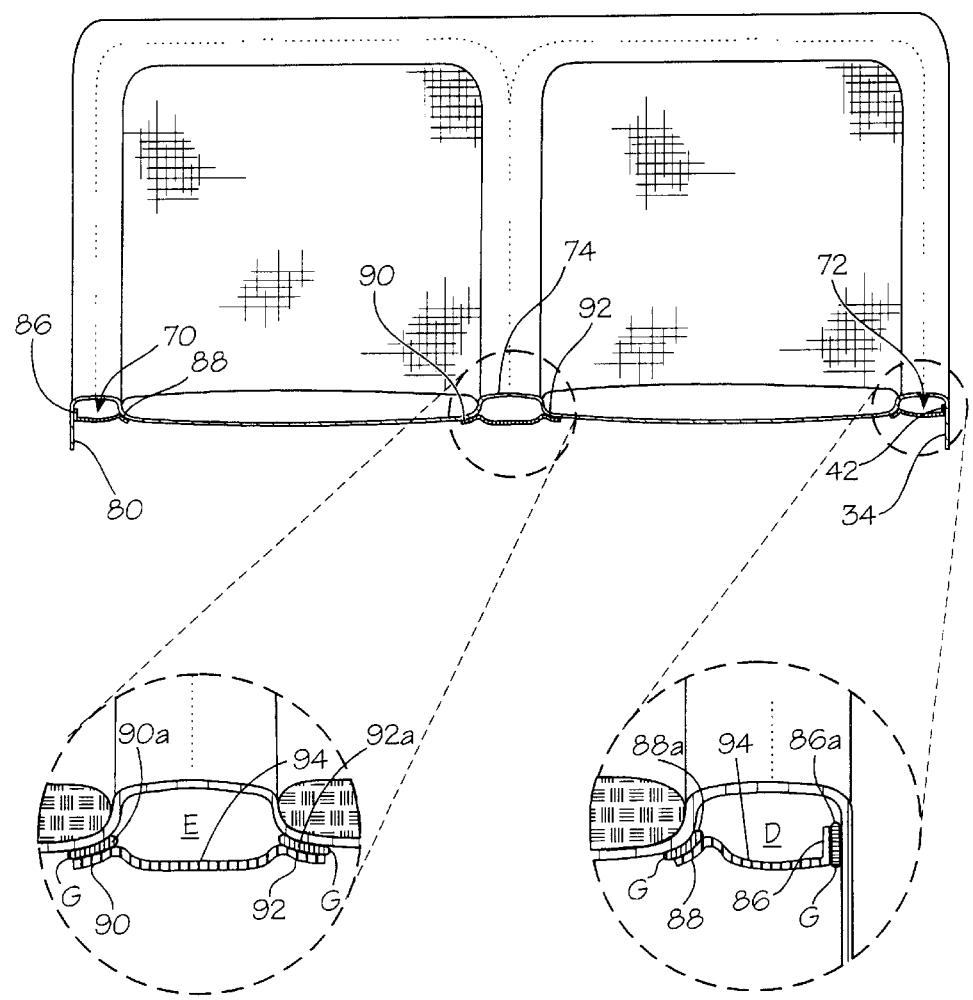
FIG. 5 is a front elevation with a section taken along line 5—5 of FIG. 1, illustrating the enclosed cells of the longitudinal tubular rib elements of a reinforcing system according to the invention.
FIGS. 5A and 5B are enlargements of the cross-section of the closed cells of the tubular reinforcing elements according to the invention.
Figure 6:
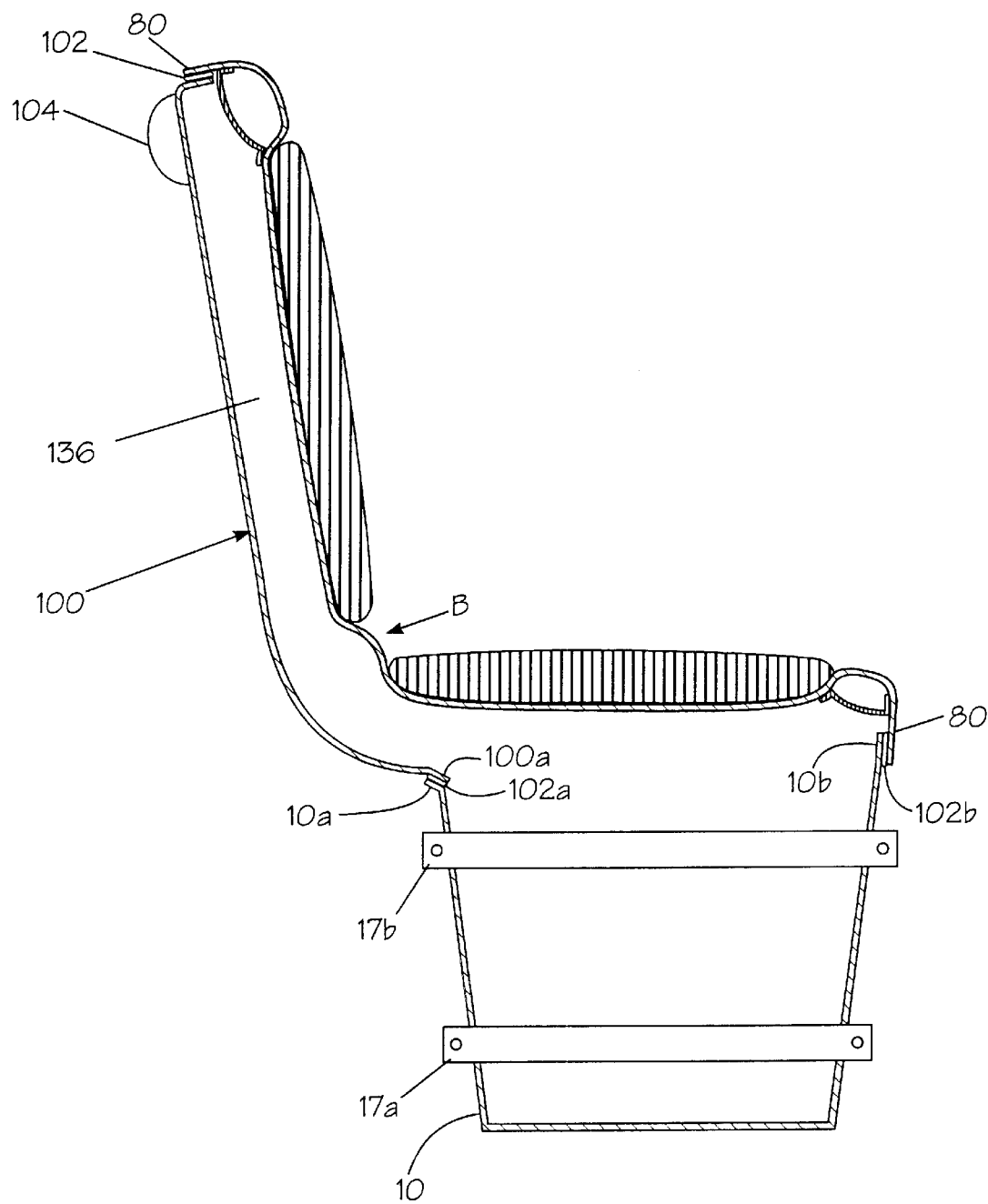
FIG. 6 is a side elevation in a section taken along line 6—6 of FIG. 1, illustrating the enclosed cells of the lateral tubular rib elements of a reinforcing system according to the invention in the transverse direction.
Figure 7:
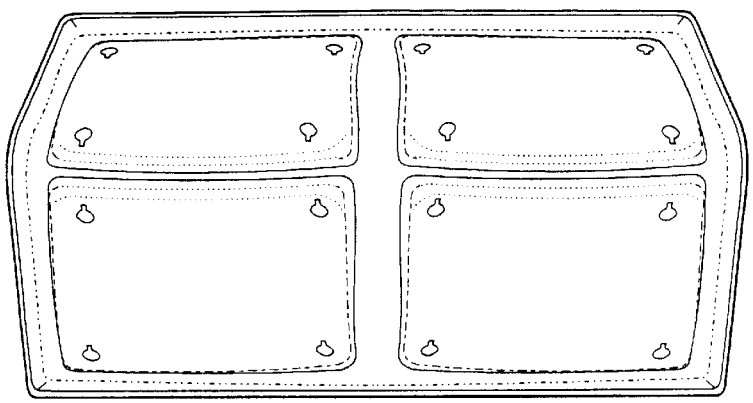
FIG. 7 is a rear elevation of a lightweight seat shell according to the invention.
Figure 8:
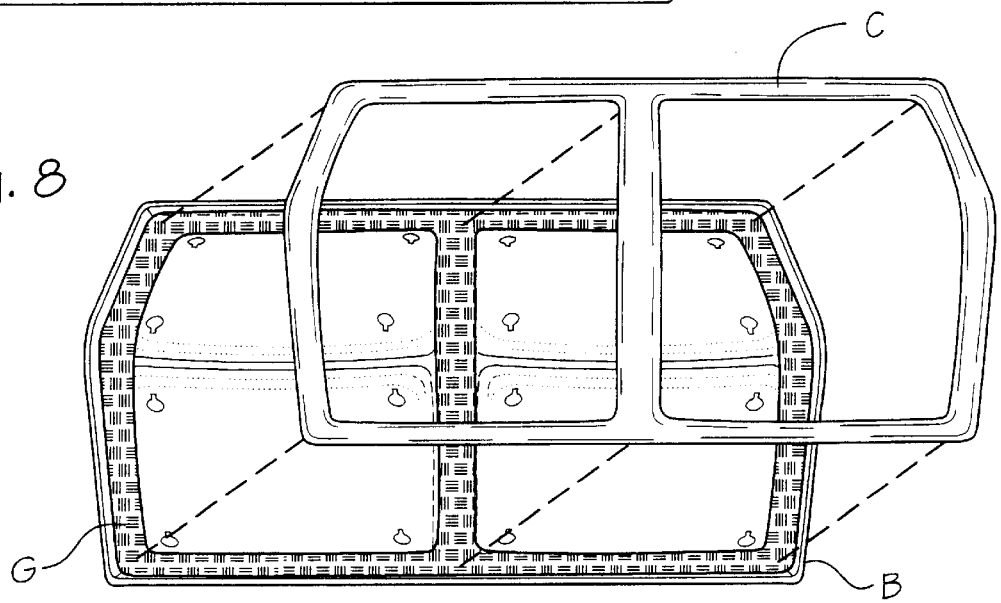
FIG. 8 is a rear elevation of lightweight seat assembly illustrating a seat shell, glue layer, with a ribbed reinforcing panel removed.
Figure 9:
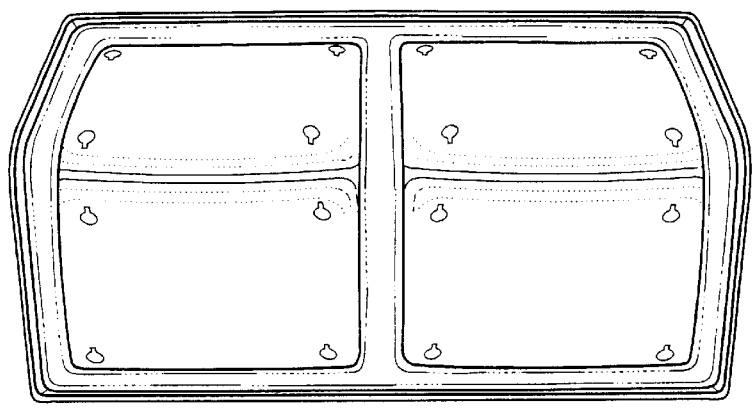
FIG. 9 is a rear elevation of lightweight seat assembly illustrating a seat shell, glue layer, with a ribbed reinforcing panel affixed.

As can best be seen in FIGS. 1A, 1B, and 3, the molded arch ribs of seat shell B and reinforcing panel C form a continuous ribbed reinforcing network around the periphery of the seat interconnected by the intermediate ribs. As affixed together the interior ribs 50–56 of reinforcing panel C span the underside of exterior ribs 20, 22 of seat shell B. The corresponding interior and exterior ribs form a network of longitudinal and lateral tubular rib elements D and E, respectively, which are generally enclosed and have a closed cell cross-section, designated generally as F (FIGS. 5–6). There are longitudinal edge tubular rib elements, designated generally as 70 and 72, on edges 34, 38 of the seat assembly, and longitudinal intermediate tubular rib elements 74 between adjacent seats 12, as need be. There is a front transverse tubular rib element 76 and a top transverse tubular rib element 78.

Longitudinal rib elements 70, 72 include exterior seat and back ribs 30a, 32a and 30b, 32b, and interior seat and back ribs 50a, 50b and 52a, 52b, respectively. Longitudinal intermediate tubular rib element 74 includes exterior intermediate ribs 42a, 42b and interior intermediate ribs 58a, 58b. Front transverse tubular rib element 76 includes exterior front rib 20 and interior front rib 54 (54a, 54b). Top transverse tubular rib element 78 includes exterior top transverse rib 20 and interior top transverse ribs 56 (56a; 56b).

Advantageously, it has been found according to the invention that acrylic glue welding may be used to weld the adjoining surfaces of the back of seat shell B and reinforcing panel C. In particular, it will be noted that the molded construction and use of glue welding makes the seat assembly extremely rigid and provides a seat assembly of high structural integrity eliminating the need for a metal underframe as has been utilized in prior seat assemblies. Preferably, the seat shell B and reinforcing panel C are formed by a resin infusion molding (RIM) process and, particularly, a vacuum resin infusion molding process known as V-RIM. As molded, seat shell B includes a peripheral rim, designated generally as 80, which is integral with exterior peripheral rib 20, and turns rearwardly to form interior 13b and shell B. While the arched rib surfaces of exterior ribs 20, 22 may be of any shape that provides reinforcement when glued together with the reinforcing panel C, the illustrated embodiment includes a surface 82a inclined upwardly from rim 80 and a second surface 82b which is inclined downwardly to an integral joiner with the sidewalls 84 of seat and back recesses 14 and 16.

In regard to the interior ribs of ribbed reinforcing panel C, there are flanges 86, 88, 90, and 92 on either side of flattened U-shaped channel 94. The flanges provide stiffening to the channels as reinforcing members and provide an attachment surface for gluing to the shell interior in order to bridge the exterior ribs to form tubular reinforcing elements Flanges 86 and 88 are formed on either side of channel 94 along the interior peripheral rib comprised of interior ribs 50, 52, 54, and 56. As can best be seen in FIGS. 5–6, flange 86 is turned upward and glued to the inside of rim 80 about the entire periphery of exterior peripheral rib 20 and seat shell B at 86a (FIG. 5b). Flange 88 is turned outward and is glued to shall interior 13b at the opposing side of exterior peripheral rib 20 at 86a. Flanges 90 and 92 extend outwardly from channel 94 on opposing sides of interior intermediate rib 58 and are glued to shell interior 13b on opposing sides of exterior intermediate rib 22 at 90a and 92a (FIG. 5a). A layer of glue G is disposed between the complimentary mating surfaces of seat shell B and reinforcing panel C. This feature is also illustrated in the drawings where glue G is illustrated by a cross hatched layer as can best be seen in FIGS. 2C and 6.

Figure 4:
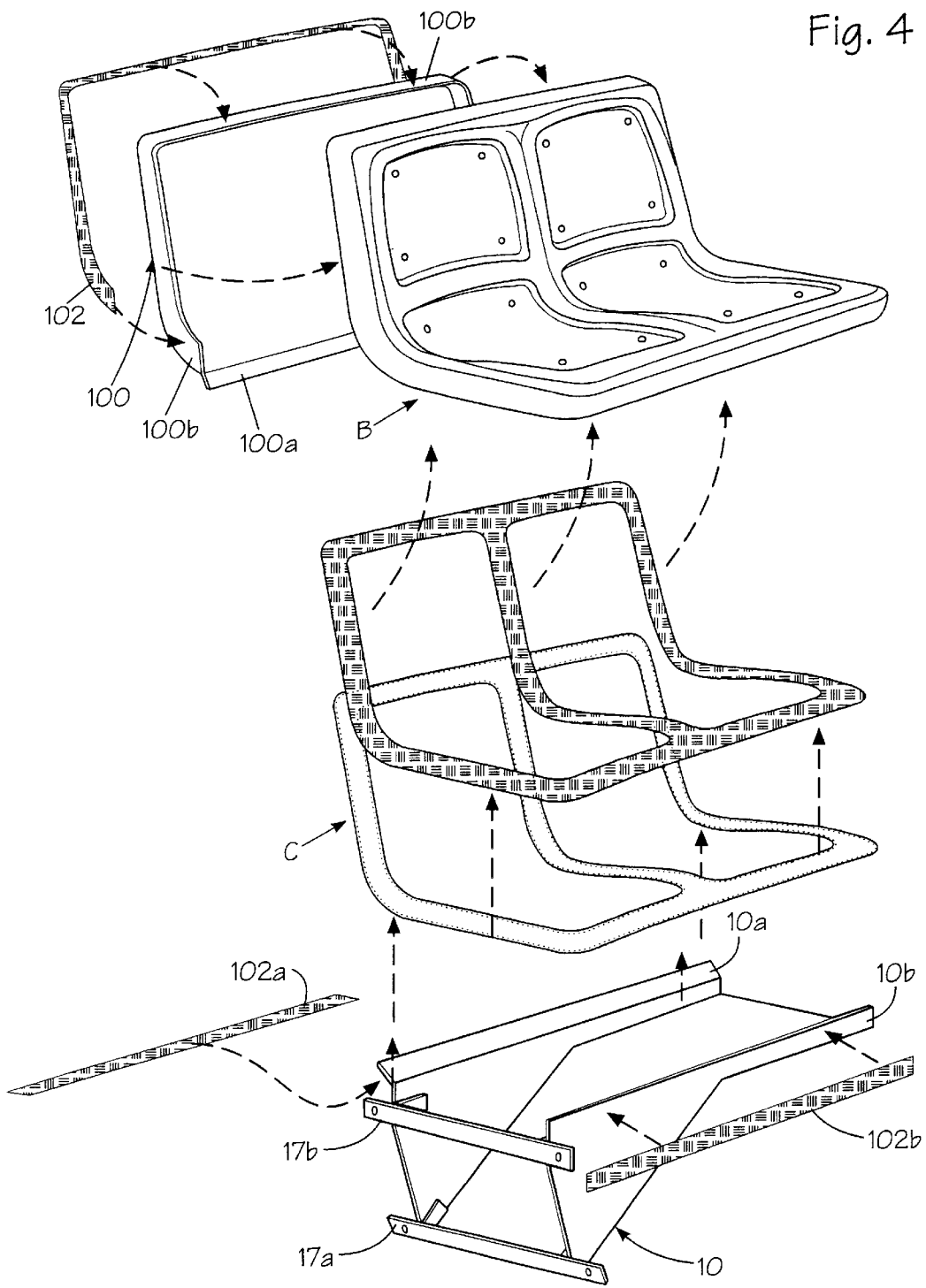
FIG. 4 is a perspective view with parts separated illustrating a seat assembly having a seat shell, glue layer, and reinforcing panel according to the invention.
Figure 10:
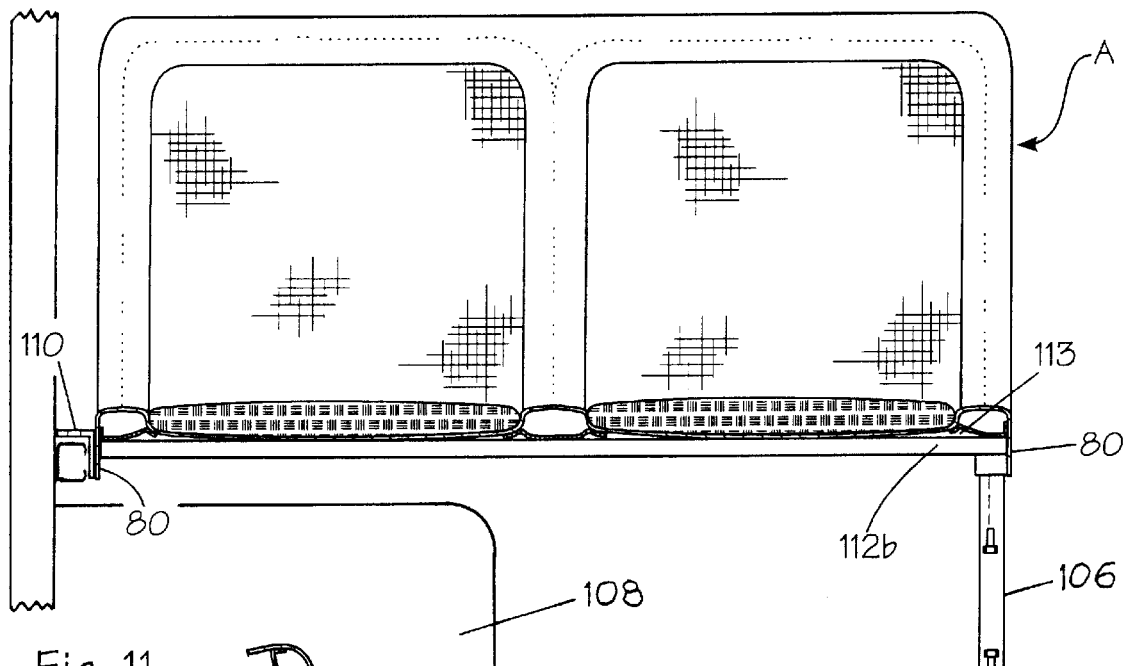
FIG. 10 is a front elevation illustrating a lightweight seat assembly according to the invention with a pedestal support mount for fixing the seat assembly to a transportation vehicle over a wheel well.
Figure 11:
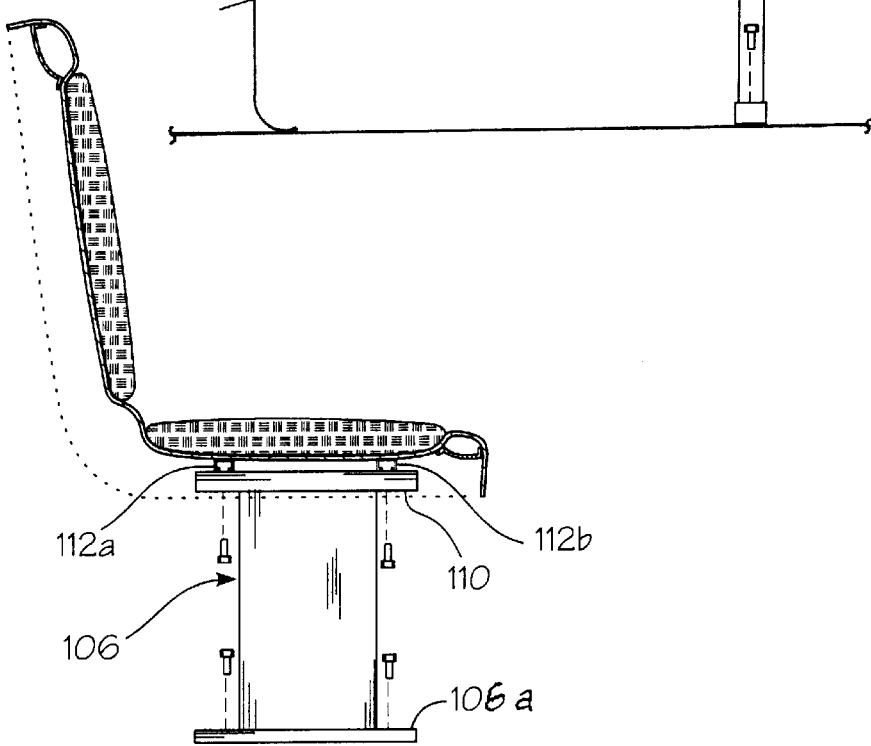
FIG. 11 is a side elevation with parts cut away illustrating the channel bar mount and tubular reinforcing system of the seat assembly.

As can best be seen in FIGS. 4 and 10–11, a back shell, designated generally as 100, is affixed to interior 13b of seat shell B by suitable means such as a layer or bead 102 provided by glue welding. Back shell 100 is molded as one piece using a V-RIM or other suitable welding process. Back shell 100 includes a lower turned flange 100a which is glued to a turned flange 10A of cantilevered support 10 by a glue bead 102a. Rim 100b of back shell 100 is glued to the inside of rim 80 of seat shell B by means of glue bead 102. Cantilevered support 10 further includes a front edge 10b that is glued to the inside of shell rim 80 by means of a glue bead 102b. Track mounting brackets 17a, 17b may be molded into cantilevered support 10, or affixed thereto by other suitable means. Affixed to the back shell is a suitable crash or bubble pad 104 per governmental requirements.

Turning now to FIGS. 10–11, an embodiment of a transverse, forward-facing seat assembly A is illustrated with a pedestal mount, designated generally as 106, necessary when located over a vehicle wheel well 108. The pedestal support includes a floor mount 106a affixed to the vehicle floor by bolts, and a seat mount 110 affixed by bolts to two transverse channel bars 112a and 112b glue welded to the interior of seat shell B, as can best be seen in FIG. 11. For this purpose, a bead of glue 113 may be applied across the top surface of the bars which also contact the interior of the shell underneath seat section 24. A wall bracket 110 affixed to shell rim 80 may be affixed to the vehicle wall.

Figure 12:
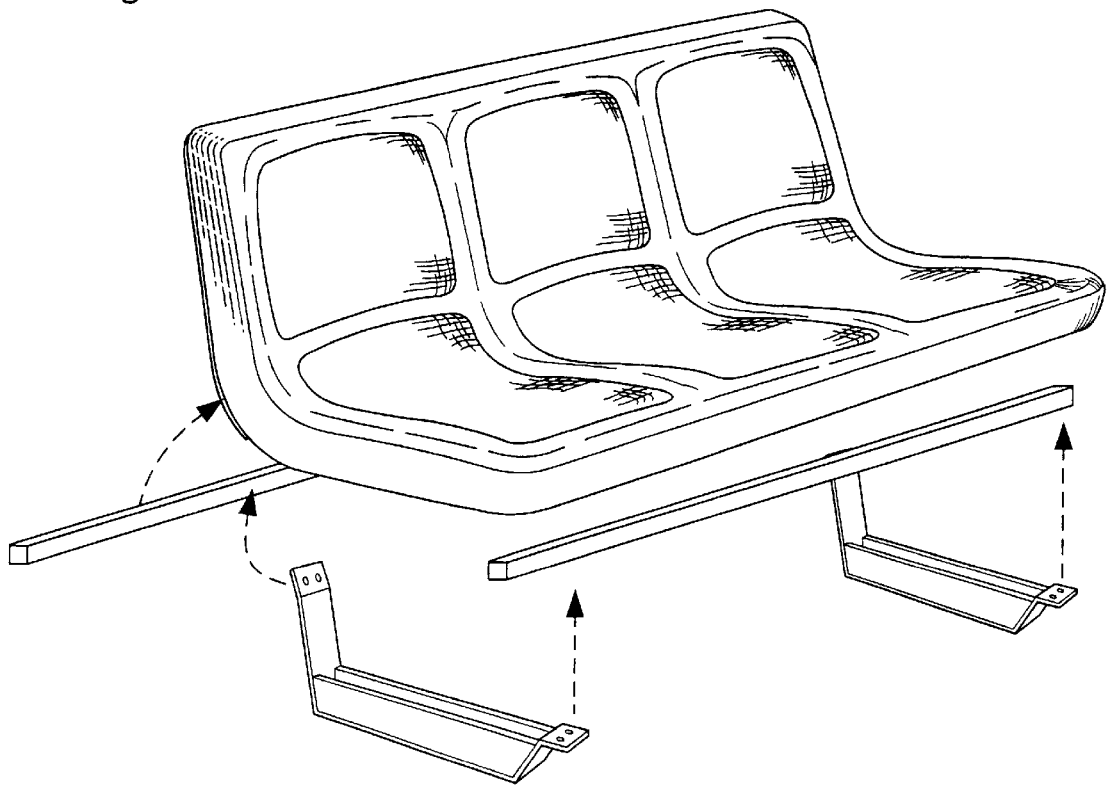
FIG. 12 is a perspective view of a longitudinal seat assembly which faces the aisle of a public transportation vehicle wherein the seat assembly includes three seats mounted to the vehicle wall, and is constructed according to the lightweight construction and method of the present invention.
Figure 13:
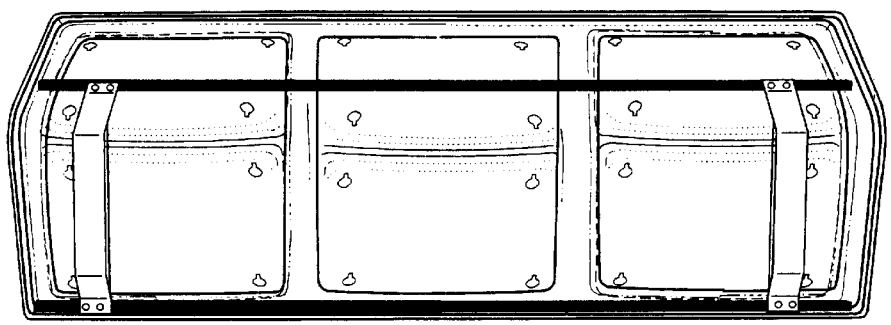
FIG. 13 is a bottom view illustrating a longitudinal seat assembly having three seats constructed according to the present invention.

As can best be seen in FIGS. 12 and 13, a longitudinal, aisle facing seat assembly, designated generally as A', is constructed according to the invention having three seats 12 instead of two. The construction of seat assembly A' is basically the same as seat assembly A, except that shell B' has an additional seat 12 and additional seat and back recess 14, 16. Shell B' and reinforcing panel C' have an additional exterior and interior intermediate rib 22' and 58', respectively. Seat assembly A' includes two longitudinal channel bars 120a and 120b glued to the interior 13b' of seat shell B', and affixed to mounting brackets 122 by means of bolts. Brackets 122 are then affixed to wheel wells and/or wall track structure, over which the seat assembly extends. Because the aisle facing seat assembly is supported more along the track of the vehicle, it is not necessary that it is reinforced as much as the forward facing seats. For example, individual tubular rib elements may be formed only at the corners of seat shell B', B and the intermediate tubular rib elements need not extend continuously through the seat, curved, and back sections.

While a preferred embodiment of the invention has been described using specific terms, such description is for illustrative purposes only, and it is to be understood that changes and variations may be made without department from the spirit or scope of the following claims.

What is claimed is:

1. A lightweight seat assembly for a transportation vehicle comprising:

a molded unitary seat shell having a shell exterior and a shell interior;

said seat shell including a seat section, a back section, and a curved section joining said seat and back sections;

a plurality of seats formed on the exterior of said seat shell;

an exterior peripheral rib formed around a periphery of said shell exterior;

an exterior intermediate rib defined on said shell exterior between adjacent seats, and said exterior intermediate rib being integral with said exterior peripheral rib;

interior reinforcing rib structure secured to said shell interior of said seat shell mating with said exterior peripheral and intermediate ribs to form reinforcing rib elements;

said interior reinforcing rib structure including interior seat-section rib structure for reinforcing said seat section and interior back-section rib structure for reinforcing said back section;

said interior seat-section rib structure including;
      an interior first seat rib bridging said exterior peripheral rib on a first edge of said seat section,
      an interior second seat rib bridging said exterior peripheral rib on a second edge of said seat section, and
      an interior intermediate seat rib bridging said exterior intermediate rib in said seat section of said shell interior; and said interior back-section rib structure including;
      an interior first back rib bridging said exterior peripheral rib on said first edge of said back section,
      interior second back rib bridging said exterior peripheral rib on said second edge of said back section, and
      an interior intermediate back rib bridging said exterior intermediate rib of said seat shell in said back section of said shell interior.

2. The assembly of claim 1 wherein said interior first and second seat ribs, said interior first and second back ribs, and said interior intermediate seat and back ribs are formed as a one-piece reinforcing panel affixed to said shell interior.

3. The assembly of claim 2 wherein said interior reinforcing panel is glue welded to said shell interior.

4. The assembly of claim 1 wherein said first and second interior seat ribs, said first and second interior back ribs, and said interior intermediate seat and back ribs include generally U-shaped channels having first and second flanges formed on opposing sides of said channel secured to the interior of said seat shell.

5. The assembly of claim 4 including a rim formed about a periphery of said seat shell extending inwardly from said exterior peripheral rib, and said first flange of said interior seat and back ribs is affixed to said rim.

6. The assembly of claim 5 wherein said first flange of said interior seat and back ribs is turned upward and affixed to said rim.

7. The assembly of claim 6 wherein said second flange of said interior seat ribs and interior back ribs is affixed to said seat shell interior.

8. The assembly of claim 7 wherein said interior intermediate rib includes opposing side flanges, and said side flanges are affixed to opposing sides of said exterior intermediate rib on the interior of said seat shell.

9. The assembly of claim 6 wherein said exterior peripheral rib and rim extend continuously about said seat shell periphery.

10. The assembly of claim 1 wherein said interior first seat and back ribs are integral and extend continuously through said curved section, and said interior second seat and back ribs are integral and extend continuously through said curved section.

11. The assembly of claim 10 wherein said interior intermediate seat and back ribs are integral and form a continuous interior intermediate rib which extends through said curved section of said seat shell.

12. The assembly of claim 1 wherein:
said interior first and second seat ribs bridge said exterior peripheral rib to form enclosed tubular seat rib elements for reinforcing said seat section on said first and second edges; and
said interior first and second back ribs bridge said exterior peripheral rib to form enclosed tubular back rib elements for reinforcing said back section on said first and second edges.

13. The seat assembly of claim 12 wherein said tubular seat and back rib elements extend continuously through said seat, back and curved sections of said seat shell.

14. The assembly of claim 13 wherein said interior seat-section reinforcing rib structure includes an interior front seat rib bridging said exterior peripheral rib across a front width of said seat section to create a generally enclosed front tubular rib element; and said interior back-section reinforcing rib structure includes an interior top back rib bridging said exterior peripheral rib across a top width of said back section to create a generally enclosed top tubular rib element.

15. The seat assembly of claim 14 wherein said exterior intermediate rib and said interior intermediate seat and back ribs form a generally continuous and enclosed intermediate tubular rib element disposed between adjacent seats of said seat shell, and said intermediate tubular rib element being integral with said front and top tubular rib elements.

16. The seat assembly of claim 1 including a cantilevered support for supporting said seat shell, said cantilevered support being affixed to said seat shell.

17. The seat assembly of claim 16 wherein said cantilevered support includes a first surface affixed to said peripheral rib of said molded seat shell and a second surface affixed to a lower flange of said back section.

18. The seat assembly of claim 17 including a mounting bracket affixed to one of said seat shell and cantilevered support for mounting said seat shell to said vehicle.

19. The assembly of claim 1 including a pedestal support for supporting said seat shell having a generally vertical pedestal supporting said seat shell, and at least one lateral channel bar affixed to said interior of said seat shell having a first end affixed to said pedestal.

20. The assembly of claim 19 including a mount affixed to a second end of said channel bar for mounting said seat shell to the vehicle.

21. The assembly of claim 1 wherein said seats include seat recesses formed in said seat-section with seat panels inserted in said seat recesses, and back recesses formed in said back-section with back panels inserted in said back recesses.

22. The assembly of claim 1 wherein said interior seat-section rib structure and said interior back-section rib structure are glue welded to the interior of said seat shell.

23. A lightweight seat assembly for a transportation vehicle comprising:
a molded unitary seat shell having a shell exterior and a shell interior;
said unitary seat shell including a seat section and a back section joined by a curved section;
a plurality of seats provided on the interior of said seat shell;
exterior rib structure formed in said seat shell which includes:
exterior first and second seat ribs formed on first and second edges of said seat section, an exterior intermediate seat rib formed between adjacent seats in said seat section, and an exterior front rib extending generally across a front width of said seat section;
exterior first and second back ribs formed on first and second edges of said back section, an exterior intermediate back rib formed between adjacent seats in said back section, and an exterior top rib extending generally across a top width of said back section;
interior reinforcing rib panel structure affixed to said interior of said seat shell spanning said exterior rib structure of said seat shell, wherein said interior rib panel structure includes;
interior first and second seat ribs bridging said exterior first and second seat ribs, an intermediate interior seat rib bridging said exterior intermediate seat rib, an interior front rib bridging said exterior front rib, and
interior first and second back ribs bridging said exterior first and second back ribs, an intermediate interior back rib bridging said exterior intermediate back rib, and an interior top rib bridging said exterior top rib;
whereby a lightweight reinforced seat assembly is provided.

24. The assembly of claim 23 including an outer rim formed about a periphery of said seat section and back section of said molded seat shell; and said interior first and second seat ribs and said interior front and top ribs including a flange which is adhered to said rim.

25. The assembly of claim 24 wherein said interior reinforcing panel is glue welded to said shell interior.

26. The assembly of claim 24 wherein said first and second interior seat ribs, said first and second interior back ribs, and said interior intermediate seat and back ribs include generally U-shaped channels having first and second flanges formed on opposing sides of said channel secured to the interior of said seat shell.

27. The assembly of claim 26 including a rim formed about a periphery of said seat shell extending inwardly from an exterior peripheral rib, and said first flange of said interior seat and back ribs is affixed to said rim.

28. The assembly of claim 27 wherein said first flange of said interior seat and back ribs is turned upward and affixed to said rim.

29. The assembly of claim 27 wherein said interior intermediate rib includes opposing side flanges, and said side flanges are affixed to opposing sides of said exterior intermediate rib on the interior of said seat shell.

30. The assembly of claim 24 wherein said interior first seat and back ribs are integral and extend continuously through said curved section, and said interior second seat and back ribs are integral and extend continuously through said curved section.

31. The assembly of claim 30 wherein said interior intermediate seat and back ribs are integral and form a continuous interior intermediate rib which extends through said curved section of said seat shell.

32. The assembly of claim 24 wherein said interior first and second seat ribs, said interior first and second back ribs, and said interior intermediate seat and back ribs are formed as a one-piece reinforcing panel affixed to said shell interior.

33. A lightweight reinforced seat assembly for a transportation vehicle comprising:
a molded seat shell having a shell exterior and a shell interior;
said seat shell including a seat section and a back section joined together by a generally curved section;
a plurality of seats included in said seat shell;
a reinforcing network of longitudinal and lateral, generally enclosed tubular rib elements reinforcing said seat shell whereby metal framing is eliminated; and
said reinforcing rib network including;
a front tubular rib element extending laterally across a front width of said seat section,
a top tubular rib element extending laterally across a top width of said back section,
longitudinal edge tubular rib elements on opposing edges of said seat shell extending generally through said seat-section, curved section, and back-section, said edge tubular rib elements being connected to said front and top tubular rib elements, and
an intermediate tubular rib element extending between adjacent ones of said plurality of seats connected to said front and top tubular rib elements.

34. The assembly of claim 33 wherein said longitudinal edge rib elements extend continuously through said seat, curved, and back sections of said seat shell.

35. The seat assembly of claim 34 wherein said longitudinal edge ribs and said front and top tubular rib element are formed as one piece around the periphery of said seat shell.

36. The assembly of claim 33 including:
exterior first and second seat ribs formed on first and second edges of said seat section, an exterior intermediate seat rib formed between adjacent seats in said seat section, and an exterior front rib extending generally across a front width of said seat section;
exterior first and second back ribs formed on first and second edges of said back section, an exterior intermediate back rib formed between adjacent seats in said back section, and an exterior top rib extending generally across a top width of said back section;
interior reinforcing rib panel structure affixed to said interior of said seat shell spanning said exterior rib structure of said seat shell, wherein said interior rib panel structure includes;
interior first and second seat ribs bridging said exterior first and second seat ribs, an intermediate interior seat rib bridging said exterior intermediate seat rib, an interior front rib bridging said exterior front rib, and a interior top rib bridging said exterior top rib so that a lightweight reinforced seat assembly is provided.

37. The assembly of claim 36 wherein said interior first and second seat ribs, said interior first and second back ribs, and said interior intermediate seat and back ribs are formed as a one-piece reinforcing panel affixed to said shell interior.

38. The assembly of claim 37 wherein said interior reinforcing panel is glue welded to said shell interior.

39. The assembly of claim 38 wherein said first and second interior seat ribs, said first and second interior back ribs, and said interior intermediate seat and back ribs include generally U-shaped channels having first and second flanges formed on opposing sides of said channel secured to the interior of said seat shell.

40. The assembly of claim 33 wherein said interior first seat and back ribs are integral and extend continuously through said curved section, and said interior second seat and back ribs are integral and extend continuously through said curved section.

41. The assembly of claim 40 wherein said interior intermediate seat and back ribs are integral and form a continuous interior intermediate rib which extends through said curved section of said seat shell.

* * * * *